US012623374B2

(12) United States Patent
Li et al.

(10) Patent No.: US 12,623,374 B2
(45) Date of Patent: May 12, 2026

(54) LOWER JACKING MEMBER, WIRE WITHDRAWAL METHOD, AND SQUARING MACHINE

(71) Applicant: FUZHOU SKYWIRETECH CO., LTD., Fuzhou (CN)

(72) Inventors: Haiwei Li, Fuzhou (CN); Bo Li, Fuzhou (CN); Xinghua Liang, Fuzhou (CN); Shubin Fan, Fuzhou (CN); Guangjian Zheng, Fuzhou (CN); Cien Chen, Fuzhou (CN); Wenren Wang, Fuzhou (CN); Zhouchen Lin, Fuzhou (CN); Jinfeng Shen, Fuzhou (CN); Chaojie Chen, Fuzhou (CN); Dejing He, Fuzhou (CN); Wusen Chen, Fuzhou (CN)

(73) Assignee: FUZHOU SKYWIRETECH CO., LTD., Fuzhou (CN)

( * ) Notice: Subject to any disclaimer, the term of this patent is extended or adjusted under 35 U.S.C. 154(b) by 389 days.

(21) Appl. No.: 18/362,119

(22) Filed: Jul. 31, 2023

(65) Prior Publication Data

US 2025/0026041 A1 Jan. 23, 2025

(30) Foreign Application Priority Data

Jul. 19, 2023 (CN) ......................... 202310884110.8

(51) Int. Cl.
*B28D 5/00* (2006.01)
*B28D 5/04* (2006.01)

(52) U.S. Cl.
CPC ......... *B28D 5/0082* (2013.01); *B28D 5/0064* (2013.01); *B28D 5/045* (2013.01)

(58) Field of Classification Search
CPC ...... B28D 5/0064; B28D 5/0082; B28D 5/04; B28D 5/045; B28D 5/0058; B28D 1/08;
(Continued)

(56) References Cited

U.S. PATENT DOCUMENTS

2024/0416557 A1* 12/2024 Hou ..................... B28D 5/0082

FOREIGN PATENT DOCUMENTS

CN 110126107 A * 8/2019 ........... B28D 5/0082
CN 212602669 U 2/2021
(Continued)

OTHER PUBLICATIONS

Machine translation of CN-216181765-U (Year: 2022).*
(Continued)

*Primary Examiner* — Robert F Neibaur
(74) *Attorney, Agent, or Firm* — Westbridge IP LLC

(57) ABSTRACT

Disclosed are a lower jacking member, a wire withdrawal method based on the lower jacking member, and a squaring machine including the lower jacking member. The lower jacking member is used for axially fixing a bottom surface of an edge scrap formed by cutting a round rod, and a bottom outline of the edge scrap has a cutting edge. The lower jacking member includes at least two single components, and drive structures independently connected to the single components. A spacing between at least one of the single components and the cutting edge is different from a spacing between the rest of the single components and the cutting edge; and the drive structures are used for driving tops of the single components to abut against the bottom surface of the edge scrap.

20 Claims, 11 Drawing Sheets

(58) Field of Classification Search
CPC . B28D 1/12; B28D 1/24; B28D 7/005; B28D 7/04; B28D 7/043; B24B 41/06; B24B 41/061; B24B 41/067
USPC .......................................... 125/21, 30.02, 35
See application file for complete search history.

(56) References Cited

FOREIGN PATENT DOCUMENTS

| | | | | | |
|---|---|---|---|---|---|
| CN | 216181765 U | * | 4/2022 | ............ | B24B 41/06 |
| CN | 114589824 A | | 6/2022 | | |
| WO | WO-2020221133 A1 | * | 11/2020 | ............ | B28D 5/045 |

OTHER PUBLICATIONS

Machine translation of CN-110126107-A (Year: 2019).*
Machine translation of WO-2020221133-A1 (Year: 2020).*
First Office Action issued in counterpart Chinese Patent Application No. 202310884110.8, dated Aug. 29, 2025.

* cited by examiner

LOWER JACKING MEMBER, WIRE WITHDRAWAL METHOD, AND SQUARING MACHINE

CROSS-REFERENCE TO RELATED APPLICATIONS

This application claims priority to Chinese Patent Application No. 202310884110.8, filed on Jul. 19, 2023, the content of which is incorporated herein by reference in its entirety.

TECHNICAL FIELD

The present disclosure relates to squaring equipment for monocrystalline silicon rods, in particular to a lower jacking member, a wire withdrawal method based on the lower jacking member, and a squaring machine including the lower jacking member.

BACKGROUND

In the prior art, monocrystalline silicon rods (round rods) generally require squaring to obtain square rods, and edge scraps left after cutting are recovered. During squaring of the monocrystalline silicon rods, the edge scraps generally need to be fixed axially so as to avoid toppling and other problems during squaring.

SUMMARY

In order to overcome the above defects in the prior art, the present disclosure provides a lower jacking member capable of keeping edge scraps stable in the wire withdrawal process, a wire withdrawal method based on the lower jacking member, and a squaring machine including the lower jacking member.

In order to solve the above technical problems, the present disclosure provides a lower jacking member for axially fixing a bottom surface of an edge scrap formed by cutting a round rod, a bottom outline of the edge scrap having a cutting edge,

- wherein the lower jacking member includes at least two single components, and drive structures independently connected to the single components:
- a spacing between at least one of the single components and the cutting edge is different from a spacing between the rest of the single components and the cutting edge; and
- the drive structures are used for driving tops of the single components to abut against the bottom surface of the edge scrap.

Further, each of the single components includes a base and a pressing block, wherein the base is connected to the drive structure, the pressing block is disposed on the base, and a top surface of the pressing block is higher than a top surface of the base; and a spacing between at least one of the pressing blocks and the cutting edge is different from a spacing between the rest of the pressing blocks and the cutting edge.

Further, a wire withdrawal method is provided. A lower wire withdrawal process of a cutting wire is performed by means of the lower jacking member described above.

Further, at least one of the single components abuts against the bottom surface of the edge scrap in the lower wire withdrawal process of the cutting wire by means of sequence control over the single components.

Further, the sequence control is to control vertical displacement of the pressing blocks successively from a pressing block with a smallest spacing from the cutting edge to a pressing block with a largest spacing from the cutting edge in the lower wire withdrawal process of the cutting wire.

Furthermore, a squaring machine is provided. The squaring machine includes the lower jacking members described above.

Further, the squaring machine includes edge scrap cutting structures, a feeding and discharging structure, a transferring structure, and an edge scrap receiving structure, wherein

- the lower jacking members are mounted in the edge scrap cutting structures; and
- the transferring structure is disposed among the feeding and discharging structure, the edge scrap cutting structures and the edge scrap receiving structure, and used for transferring round rods from the feeding and discharging structure into the edge scrap cutting structures, transferring edge scraps formed by cutting in the edge scrap cutting structures into the edge scrap receiving structure, and transferring square rods formed by cutting in the edge scrap cutting structures into the feeding and discharging structure.

Further, the feeding and discharging structure includes a machine table, feeding structures, discharging structures, transverse displacement structures, and at least one turnover structure, wherein the feeding structures, the discharging structures and the transverse displacement structures are mounted on the machine table, the feeding structures and the discharging structures are hinged to the transverse displacement structures, and the turnover structures are located in the machine table and located below the feeding structures and the discharging structures.

Further, the feeding structure or the discharging structure includes a bottom platform, two side plates disposed on the bottom platform, an ejector block, and a supporting assembly, wherein

- the side plates are vertically disposed on a surface of the bottom platform, the two side plates are parallel and spaced apart, rollers are disposed on inner walls and outer walls of the side plates, the supporting assembly is disposed at one ends of the side plates in a length direction, the ejector block is disposed at the other ends of the side plates in the length direction, and the ejector block is located between the two side plates.

Further, the supporting assembly includes guide rails, two sliders disposed on the two guide rails, veneers disposed on the sliders, and an air cylinder connected to at least one of the sliders.

Further, the turnover structure includes a connecting rod, a first connecting seat hinged to one end of the connecting rod, a turnover drive piece hinged to a middle of the connecting rod, and a second connecting seat hinged to the turnover drive piece.

Further, a plurality of feeding structures are provided, a plurality of discharging structures are provided, and the feeding structures and the discharging structures are provided with the corresponding turnover structures.

Further, the transferring structure includes a rotary table, and a round rod clamping structure, an edge scrap clamping structure and a square rod clamping structure disposed on side faces of the rotary table respectively.

Further, each of the edge scrap cutting structures includes a main framework, two cutting structures disposed opposite to each other, an upper jacking structure, a lower jacking structure, and a bearing platform, wherein the cutting structures are mounted on the main framework, the upper jacking structure is mounted on the main framework and located between the two cutting structures, the main framework and the lower jacking structure are fixed to the bearing platform, the lower jacking structure and the upper jacking structure are mounted axisymmetrically, an upper jacking member is mounted on the upper jacking structure, and the lower jacking member is mounted on the lower jacking structure.

Further, the edge scrap receiving structure includes an edge scrap clamping jaw assembly, an edge scrap receiving table, and an edge scrap receiving box placed on the edge scrap receiving table.

Further, the edge scrap clamping jaw assembly includes a mounting framework, an upper edge scrap clamping jaw, a lower edge scrap clamping jaw, a vertical drive structure, a transverse drive structure, and a rotating structure, wherein the vertical drive structure is mounted on the mounting framework and used for controlling a spacing between the upper edge scrap clamping jaw and the lower edge scrap clamping jaw; and the transverse drive structure and the rotating structure are mounted on the mounting framework, the transverse drive structure is used for driving the mounting framework to move transversely, and the rotating structure is used for driving the mounting framework to rotate around a Z axis.

Further, the upper edge scrap clamping jaw and the lower edge scrap clamping jaw are provided with avoidance structures for avoiding the upper edge scrap clamping jaw and the lower edge scrap clamping jaw in the transferring structure.

Further, a limiting structure is disposed at a bottom of the edge scrap receiving box, and the lower edge scrap clamping jaw has an avoidance structure for avoiding the limiting structure.

Further, an overall height of the edge scrap receiving box is smaller than a height of the edge scrap.

Further, the squaring machine further includes a traveling trolley, wherein the edge scrap receiving box is fixed to the traveling trolley, a first positioning structure is disposed at an end, facing the edge scrap clamping jaw assembly, of the traveling trolley, and a second positioning structure matching the first positioning structure is disposed at a position, corresponding to the first positioning structure, of the edge scrap receiving table.

Further, a cutting wire for forming the cutting edge is a ring wire.

The present disclosure has the following beneficial effects: the lower jacking member according to the present disclosure, combined with the specific wire withdrawal method thereof, can effectively stabilize edge scraps while effectively ensuring the stability of the cutting wire in the lower wire withdrawal process.

DETAILED DESCRIPTION OF THE EMBODIMENTS

Figure 1:
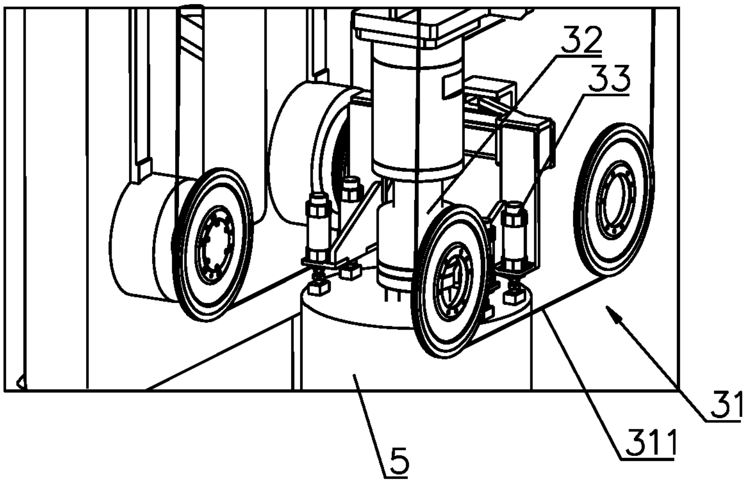
FIG. 1 is a schematic structural diagram of a first step in a cutting and wire withdrawal process according to a specific implementation of the present disclosure.

The technical content, achieved purposes and effects of the present disclosure are described below in detail in conjunction with implementations and accompanying drawings.

In the prior art, a cylindrical monocrystalline silicon rod is generally squared through a squaring machine, that is, a monocrystalline silicon rod with a square or rectangular cross section (represented by "body" herein) is formed, and a portion left after cutting is referred to as an edge scrap. Existing squaring machines include a vertical squaring machine (as in CN114536573A) and a horizontal squaring machine (as in CN113306030A), both of which are selected mainly based on lengths of monocrystalline silicon rods and specific processes. Squaring cutting of monocrystalline silicon rods is performed mainly relying on a wire cutting process. With the increase of the quantity of wheels in a cutting wheel train, the stability of the wire cutting process is improved. In the prior art, a two-wheel system, a three-wheel system, a four-wheel system, etc. are generally adopted, for example, the applicant has disclosed a ring wire saw cutting operation system (CN212218920U). Pickup strategies for edge scraps mainly include “direct pickup” and “indirect pickup”. Specifically, “direct pickup” includes at least two cases: a, a cutting system is almost unobstructed, that is, edge scraps are directly clamped and transferred through, for example, an edge scrap clamping jaw after cutting of a monocrystalline silicon rod, as in CN114536573A; and b, the cutting system is contained in a large cutting shell, where a through hole in the cutting shell allows edge scraps to pass through, thus allowing the edge scrap clamping jaw to penetrate through the through hole to clamp and transfer the edge scraps, as in CN217098379U, or, the edge scraps are moved to the through hole by means of an additional edge scrap displacement structure, and are clamped and transferred through the edge scrap clamping jaw.

In the case of “indirect pickup”, because of blocking of cutting shells, the edge scrap clamping claw must extend to a position between the two cutting shells to clamp and take out the edge scraps. However, due to the interference of the two cutting shells and cutting wheel trains, it is necessary to withdraw a cutting wire when the edge scrap clamping jaw extends. That is, in this implementation, the clamping process of the edge scrap clamping jaw is to extend to the position between the cutting wheel trains and clamp corresponding edge scraps after wire withdrawal of the cutting wheel trains, and then exit from the position between the two cutting wheel trains and transfer the edge scraps. That is, it should be understood that, a length of the through holes of the cutting shells is smaller than a length of the edge scraps, and/or a width of the through holes is smaller than a width of the edge scraps, and even the cutting shells do not have the through holes.

Of course, as the size of the through holes of the cutting shells is fixed, and a size of the monocrystalline silicon rod is adjustable, in some special cases, the edge scraps may still pass through the through holes, which is allowed in the present application. However, this case is not a general case of the present application, that is, the edge scrap may not pass through the through holes or the through holes are not included. Thus, for the sake of writing, the following description is provided on the basis of the general case described above.

The monocrystalline silicon rod need to be subjected to necessary shaft alignment and fixing before the squaring process to ensure the squaring accuracy. In the prior art, the stability of the squaring process is ensured by providing an upper jacking structure and a lower jacking structure at two axial ends of a monocrystalline silicon rod to fix an axis of the monocrystalline silicon rod as well as to achieve necessary axial fixation (as in CN114474437A). In one implementation, the same axial fixation of an edge scrap is preferred in order to maintain the stability of the edge scrap in the cutting process, as well as to avoid problems such as lateral tipping of the edge scrap after cutting, as in CN112192769A. However, due to structural limitations of the upper jacking member and the lower jacking member, it is difficult to ensure the axial fixation of the edge scrap in the withdrawal process of the cutting wire, regardless of whether it is an upper wire withdrawal strategy or a lower wire withdrawal strategy. Therefore, the inventor provides a novel lower jacking member, which, combined with a specific lower wire withdrawal method, may ensure the stability of the edge scrap while achieving efficient and safe withdrawal of the cutting wire.

Specifically, referring to FIG. 1 to FIG. 8, the inventor provides a lower jacking member 34 that may be fitted with an existing upper jacking member 33 to achieve axial fixation of an edge scrap 51. The lower jacking member is mounted on a bottom surface of the edge scrap, and a top end of the lower jacking member abuts against the bottom surface of the edge scrap to achieve fixation of a bottom surface of a monocrystalline silicon rod. The lower jacking member is constructed to include at least two single components, and drive structures 343 independently connected to the single components. A bottom outline of a round rod (that is, the above monocrystalline silicon rod) has a straight line parallel to a cutting edge of a bottom outline of the edge scrap. A spacing between at least one of the single components and the straight line is different from a spacing between the rest of the single components and the straight line. The drive structures are used for driving tops of the single components to abut against the bottom surface of the edge scrap. It is to be understood that the cutting edge of the edge scrap, that is, a cutting position of the cutting wire 311, is determined by a pre-calculated cutting edge. The straight line is arbitrary in the bottom outline of the round rod. Preferably, a straight line passing through the center of the circle is a standard straight line. In a more preferred implementation, the straight line is the cutting edge, that is, the cutting edge is a standard line for arrangement of the single components. Therefore, it is to be understood that the straight line described hereinafter is the cutting edge.

In an optional implementation, a pressure head 342 is disposed on a top of each of the single components, and the adjacent pressure heads are staggered along a radial direction of the bottom surface of the monocrystalline silicon rod, that is, a spacing between at least one of the pressure heads and the straight line is different from a spacing between the rest of the pressure heads and the straight line. In this implementation, due to the radially staggered distribution of the pressure heads, in the wire withdrawal process (radial displacement of the cutting wire), at least one of the pressure heads is pressed tightly against the bottom surface of the edge scrap while at least one of the pressure heads is out of contact with the bottom surface of the edge scrap to allow transverse displacement of the cutting wire for withdrawal, thus ensuring the stability of the edge scrap in the wire withdrawal process. Preferably, in this implementation, each of the single components includes a base 341 and a pressing block 342 disposed on the base. A top surface of the pressing block is higher than a top surface of the base. The base is connected to a vertical drive structure 343 used for driving the base and the pressing block of the single component to move towards or facing away from the bottom surface of the edge scrap, that is, for driving a top of the pressing block of the single component to abut against the bottom surface of the edge scrap. Preferably, in the withdrawal process of the cutting wire, the cutting wire is located between the top surface of the base and the bottom surface of the monocrystalline silicon rod. In this implementation, the position of the pressing block on the base is arbitrary, but it should be ensured that the top surface of the pressing block is higher than the top surface of the base. The shape of the pressing block is arbitrary in this implementation and may be selected according to actual process needs.

Figure 20:
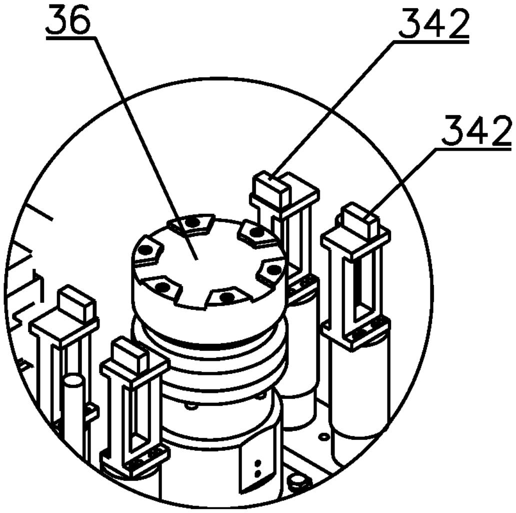
FIG. 20 shows an enlarged view of a part A in FIG. 15.

Exemplarily, referring to FIG. 20, FIG. 20 illustrates opposite mounting positions of the lower jacking member and the lower jacking structure in the general case. Since a top surface of the lower jacking structure is substantially circular, if the lower jacking structure 36 is substituted for the above round rod as a reference for the positions of the pressure heads, it may be seen that two adjacent pressure heads 342 have different spacing from the lower jacking structure, that is, the above pressure heads are staggered along the radial direction of the bottom surface of the monocrystalline silicon rod (or along the top surface of the lower jacking structure).

Figure 3:
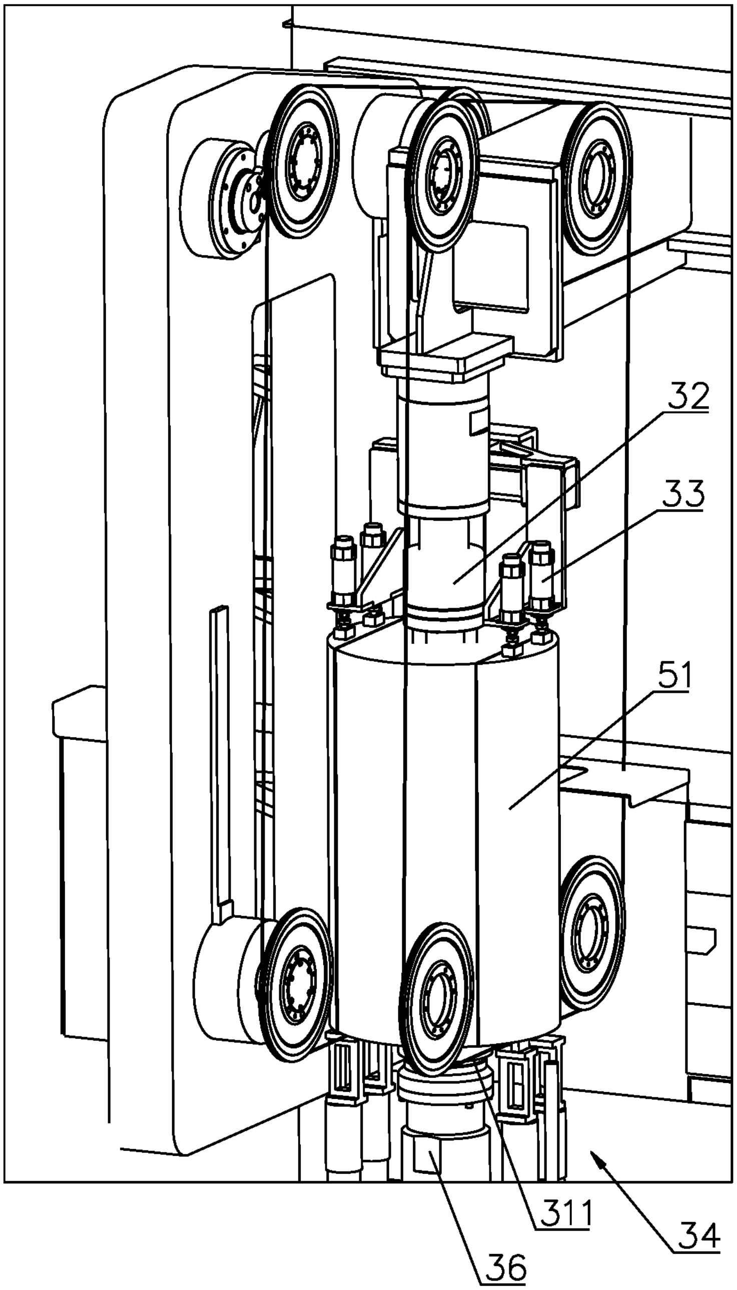
FIG. 3 is a schematic structural diagram of a third step in a cutting and wire withdrawal process according to a specific implementation of the present disclosure.

More specifically, referring to FIG. 1 and FIG. 3, a cutting wheel train 31 is moved to a cutting holding position where an upper jacking structure 32, the upper jacking member 33, the lower jacking structure 36 and the lower jacking member 34 abut against the top surface and the bottom surface of the monocrystalline silicon rod 5 respectively.

Figure 2:
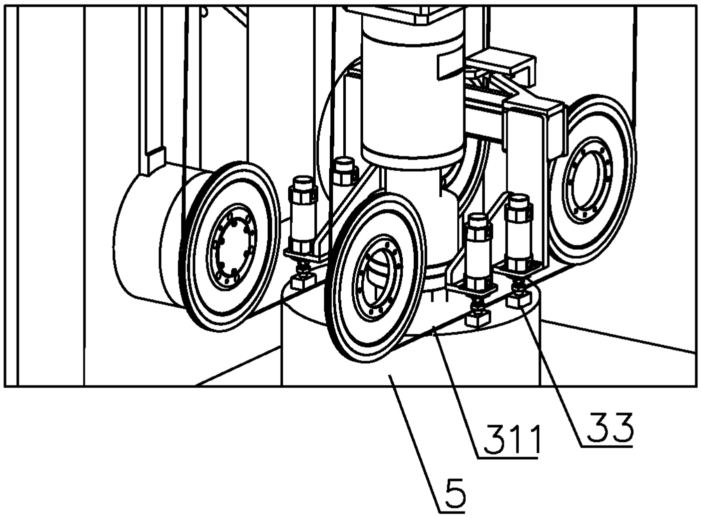
FIG. 2 is a schematic structural diagram of a second step in a cutting and wire withdrawal process according to a specific implementation of the present disclosure.

Referring to FIG. 2, the upper jacking member 33 moves upward to allow the cutting wire 311 moves radially to the cutting position, afterwards the upper jacking member 33 moves downward to abut against the top surface of the monocrystalline silicon rod again.

Referring to FIG. 3, the cutting wire 311 cuts the monocrystalline silicon rod from top to bottom along the axis direction of the monocrystalline silicon rod 5, so as to form at least one edge scrap 51. In this case, the top of the edge scrap is supported and held in place by the upper jacking member 33, and the bottom of the edge scrap is supported and held in place by the lower jacking member 34.

Figure 4:
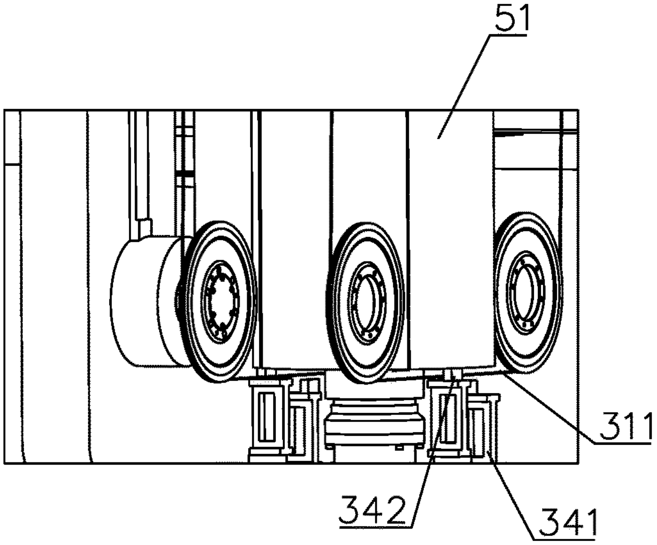
FIG. 4 is a schematic structural diagram of a fourth step in a cutting and wire withdrawal process according to a specific implementation of the present disclosure.

Referring to FIG. 4, the pressure head 342 with a small spacing from the straight line moves downward to allow the cutting wire 311 to move transversely for withdrawal, that is, the cutting wire withdraws to a position between the two adjacent pressure heads 342. In this process, the pressure head with a large spacing from the straight line is always kept abutting against the bottom surface of the edge scrap, and performs clamping together with the corresponding upper jacking member to ensure the stability of the edge scrap 51 in the wire withdrawal process. In this implementation, the withdrawal direction of the cutting wire is tangent to the straight line.

Figure 5:
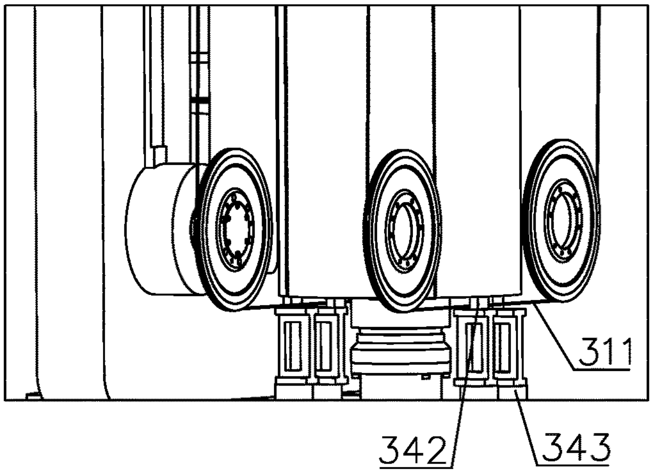
FIG. 5 is a schematic structural diagram of a fifth step in a cutting and wire withdrawal process according to a specific implementation of the present disclosure.

Referring to FIG. 5, the pressure head 342 with the small spacing from the straight line moves upward to abut against the bottom surface of the edge scrap 51 again, in this case, the cutting wire is located between the two adjacent pressure heads, and withdrawal movement thereof is prevented by the pressure head with the large spacing from the straight line.

Figure 6:
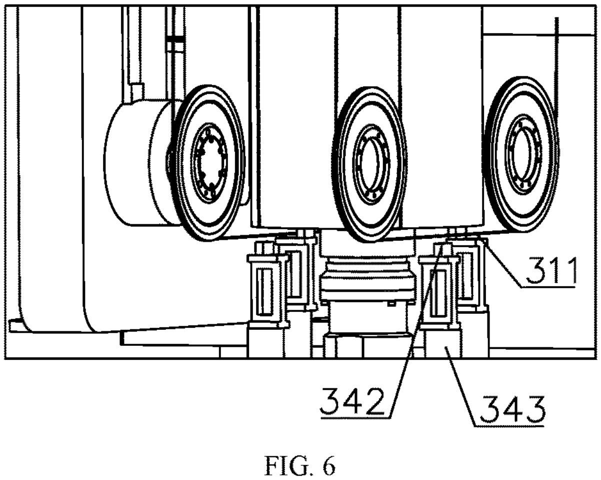
FIG. 6 is a schematic structural diagram of a sixth step in a cutting and wire withdrawal process according to a specific implementation of the present disclosure.

Referring to FIG. 6, the pressure head 342 with the large spacing from the straight line moves downward to allow the cutting wire to withdraw. In this case, the pressure head with the small spacing from the straight line is always kept abutting against the bottom surface of the edge scrap, and performs clamping together with the corresponding upper jacking member to ensure the stability of the edge scrap in the wire withdrawal process.

Figure 7:
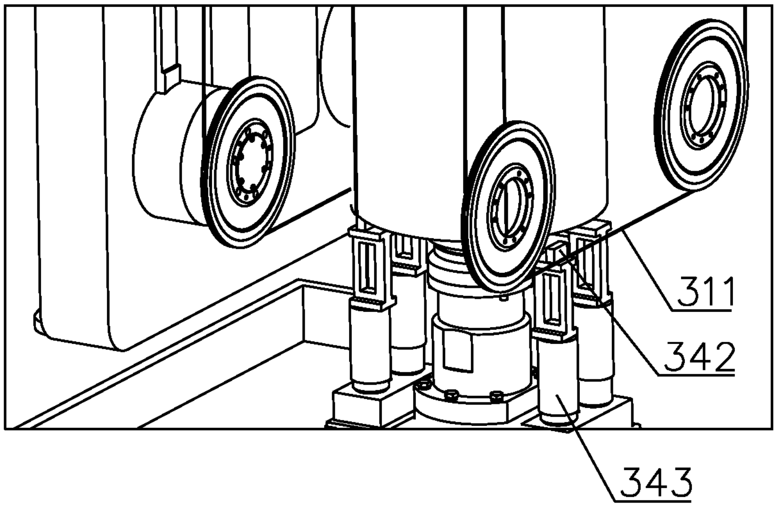
FIG. 7 is a schematic structural diagram of a seventh step in a cutting and wire withdrawal process according to a specific implementation of the present disclosure.

Referring to FIG. 7, the cutting wire 311 completely withdraws from the lower jacking member 34 and moves to the cutting holding position.

Figure 8:
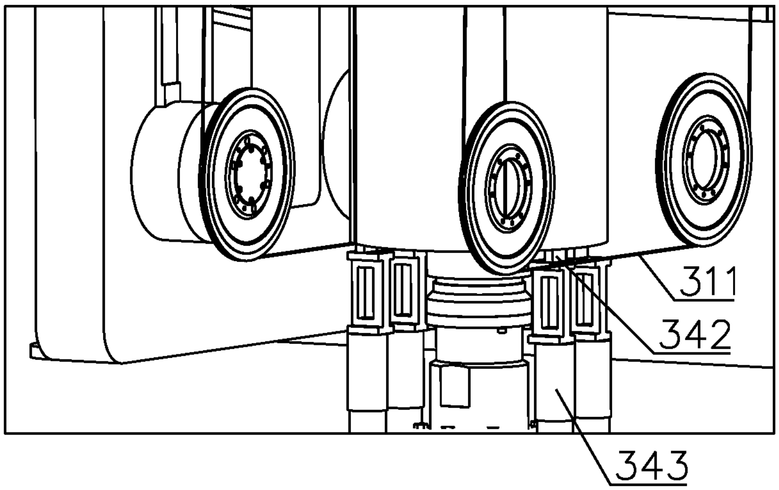
FIG. 8 is a schematic structural diagram of an eighth step in a cutting and wire withdrawal process according to a specific implementation of the present disclosure.

Referring to FIG. 8, the pressure head 342 with the large spacing from the straight line moves upward to abut against the bottom surface of the edge scrap 51 again, that is, in this process, the two pressure heads abut against the bottom surface of the edge scrap at the same time, and match the upper jacking member jointly to completely clamp the edge scrap. In this case, an external edge scrap clamping structure is allowed to pick and transfer the edge scrap between the two cutting devices.

Referring to FIG. 1 to FIG. 8, the wire withdrawal method herein may be summarized as follows: the lower wire withdrawal process of the cutting wire 311 based on the at least two single components is included, that is, at least one of the single components abuts against the bottom surface of the edge scrap 51 in the lower wire withdrawal process of the cutting wire by means of sequence control over the single components. In this implementation, the sequence control is to control vertical displacement of the pressing blocks successively from a pressing block 342 with a smallest spacing from the straight line to a pressing block with a largest spacing from the straight line in the lower wire withdrawal process of the cutting wire. It is to be noted that in the process of sequence control, it should be ensured that at least one of the pressing blocks abuts against the bottom surface of the edge scrap. Exemplarily, under the condition that the quantity of the pressing blocks is 2, only when one pressing block completely abuts against the bottom surface of the edge scrap, the other pressing block is allowed to move downward. The upward displacement and downward displacement of the pressing blocks may be achieved by an existing general vertical drive structure 343, for example, an air cylinder.

Figure 9:
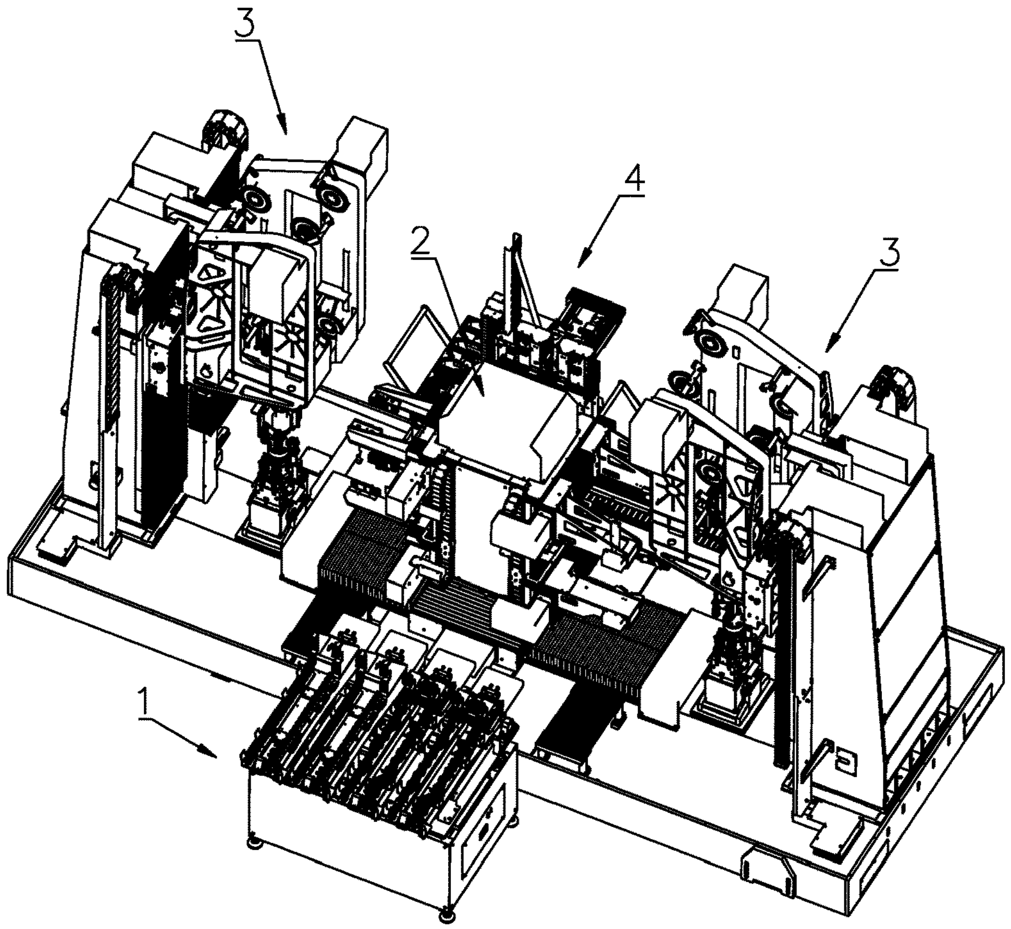
FIG. 9 is a schematic structural diagram of a squaring machine according to a specific implementation of the present disclosure.

A squaring machine is further provided. Referring to FIG. 9, the squaring machine includes edge scrap cutting structures 3 including the lower jacking members 34 described above, a feeding and discharging structure 1, a transferring structure 2, and an edge scrap receiving structure 4 (not completely shown in FIG. 9). The transferring structure is disposed among the feeding and discharging structure, the edge scrap cutting structures and the edge scrap receiving structure, and used for taking cylindrical monocrystalline silicon rods from the feeding and discharging structure and transferring the same into the edge scrap cutting structures, transferring edge scraps formed by cutting into the edge scrap receiving structure, and transferring bodies (square rods) formed by cutting into the feeding and discharging structure for discharging. The edge scraps are received by the edge scrap receiving structure and then transferred into an edge scrap receiving box.

Specifically, referring to FIG. 10 to FIG. 13 and FIG. 19, the feeding and discharging structure 1 includes a machine table 11, feeding structures 12, discharging structures 13, transverse displacement structures 127, and at least one turnover structure 14. The feeding structures, the discharging structures and the transverse displacement structures are mounted on the machine table. The feeding structures and the discharging structures are hinged to the transverse displacement structures. The turnover structures are located in the machine table and located below the feeding structures and the discharging structures. In one implementation, the feeding structures are driven by the transverse displacement structures to move transversely to a position above the turnover structures, and are driven by the turnover structures to turn over upward, that is, monocrystalline silicon rods on the feeding structures may be conveniently grabbed by the transferring structure with such a turnover method. In another implementation, the discharging structures are driven by the transverse displacement structures to move transversely to a position above the turnover structures, and are driven by the turnover structures to turn over upward, that is, bodies may be conveniently placed onto the discharging structures by the transferring structure with such a turnover method. In order to achieve resetting of the feeding structures and the discharging structures, resetting structures are preferably disposed between the feeding structures and the discharging structures and the transverse displacement structures, and the resetting structures may adopt existing general structures, for example, torsion springs 128.

Figure 11:
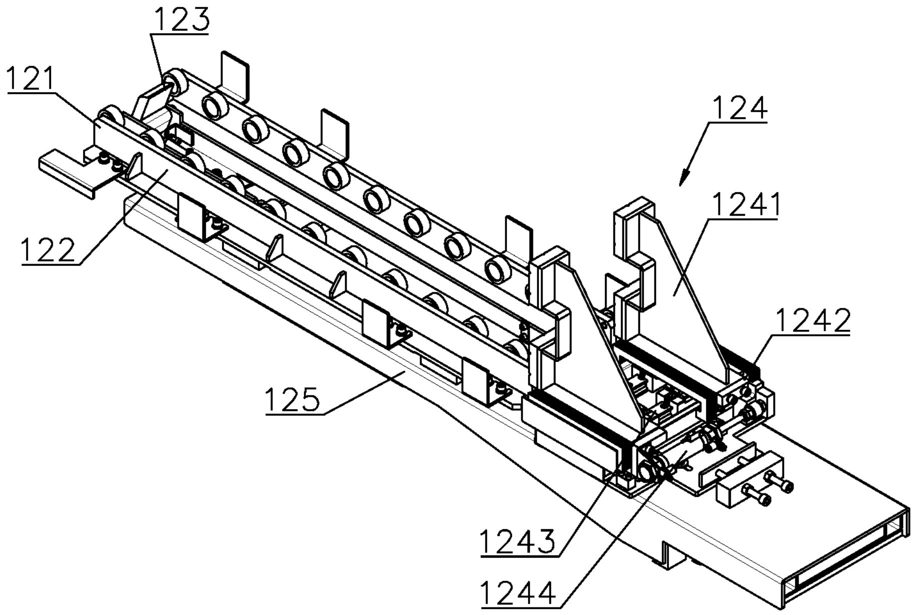
FIG. 11 is a schematic structural diagram of a feeding structure or a discharging structure in a perspective according to a specific implementation of the present disclosure.

In an optional implementation, referring to FIG. 11, each of the feeding structures/the discharging structures includes a bottom platform 125, two side plates 121 disposed on the bottom platform, and a supporting assembly 124. The side plates are vertically disposed on a surface of the bottom platform, and the two side plates are parallel and spaced apart. Rollers 122 are disposed on inner walls and outer walls of the side plates. The supporting assembly is disposed at one ends of the side plates in a length direction. The corresponding transverse displacement structure is disposed close to one side of the supporting assembly and is hinged to a bottom surface of the bottom platform. An ejector block 123 is disposed at the other ends of the side plates in the length direction, and the ejector block is located between the two side plates. Specifically, the rollers are used for supporting a monocrystalline silicon rod, and the ejector block and the supporting assembly abut against two end faces of the monocrystalline silicon rod respectively, thus achieving fixation of the monocrystalline silicon rod.

Figure 12:
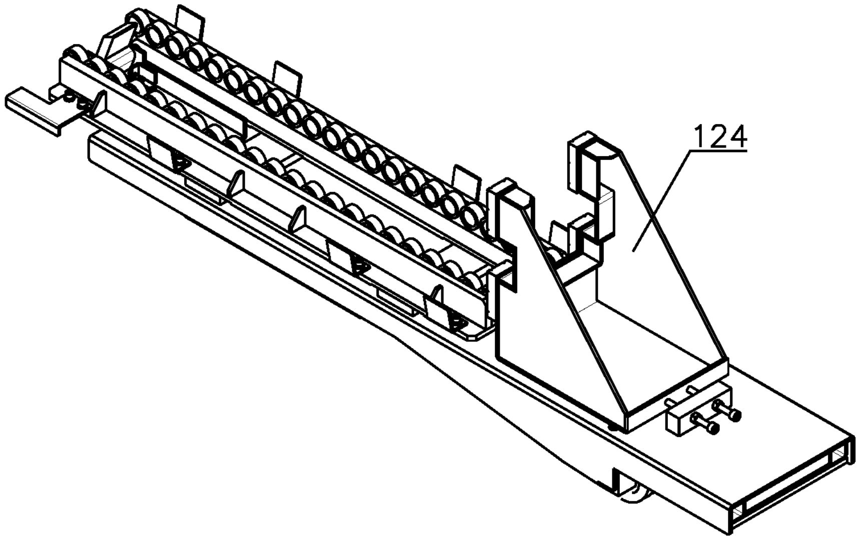
FIG. 12 is another schematic structural diagram of a feeding structure or a discharging structure in a perspective according to a specific implementation of the present disclosure.

In an optional implementation, referring to FIG. 11, the supporting assembly includes guide rails 1243, two sliders 1242 disposed on the two guide rails, veneers 1241 disposed on the sliders, and an air cylinder 1244 connected to at least one of the sliders. Specifically, the air cylinder is used for driving at least one of the sliders to move on the guide rails to control a spacing between the adjacent veneers, thus being applicable to monocrystalline silicon rods of different sizes. More preferably, surfaces of one sides, close to the monocrystalline silicon rod, of the veneers have non-slip lines which may be concave lines or convex lines, most preferably, concave lines, thus avoiding side slip of the monocrystalline silicon rod on the surfaces. Of course, the monocrystalline silicon rod may also be supported by a single veneer, as shown in FIG. 12.

Figure 13:
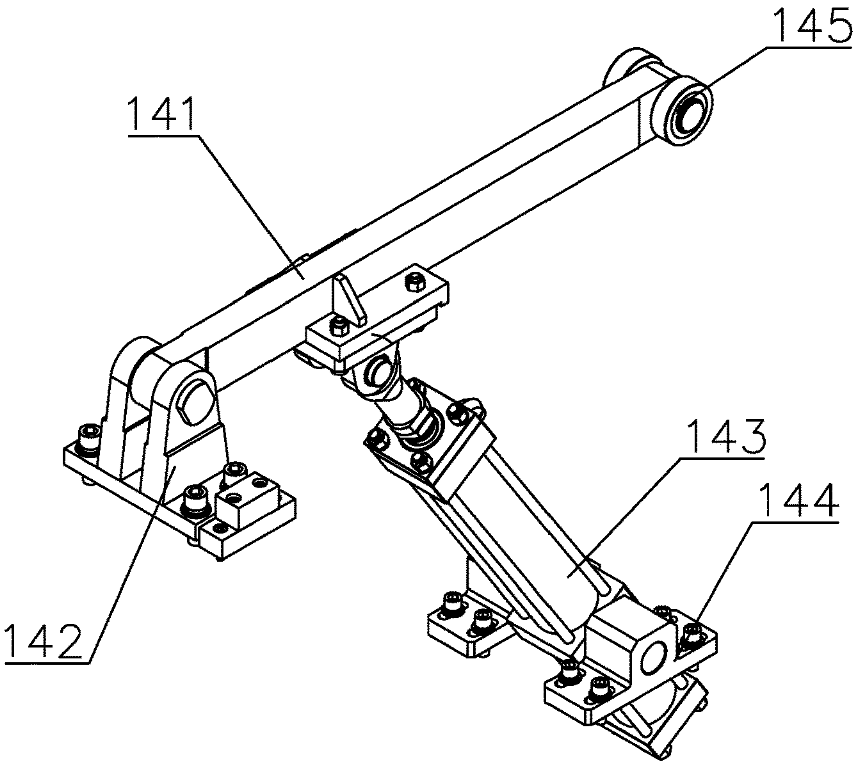
FIG. 13 is a schematic structural diagram of a turnover structure according to a specific implementation of the present disclosure.

In an optional implementation, referring to FIG. 13, the turnover structure includes a connecting rod 141, a first connecting seat 142 hinged to one end of the connecting rod, a turnover drive piece 143 hinged to a middle of the connecting rod, and a second connecting seat 144 hinged to the turnover drive piece. The first connecting seat and the second connecting seat are fixedly connected to the machine table, and a roller 145 is disposed at the other end of the connecting rod. Specifically, the turnover drive piece operates to drive the connecting rod to turn upward, and during upward turnover of the connecting rod, the connecting rod abuts against the bottom surface of the bottom platform of the feeding structure or the discharging structure located above the connecting rod, so as to drive the feeding structure or the discharging structure to turn upward. After feeding or discharging is completed, the turnover drive piece drives the connecting rod to turn downward, and meanwhile, vibration caused when the connecting rod is completely horizontal and in contact with the machine table is reduced through the roller. The turnover drive piece is of a general structure, for example, an air cylinder or an oil cylinder.

Figure 19:
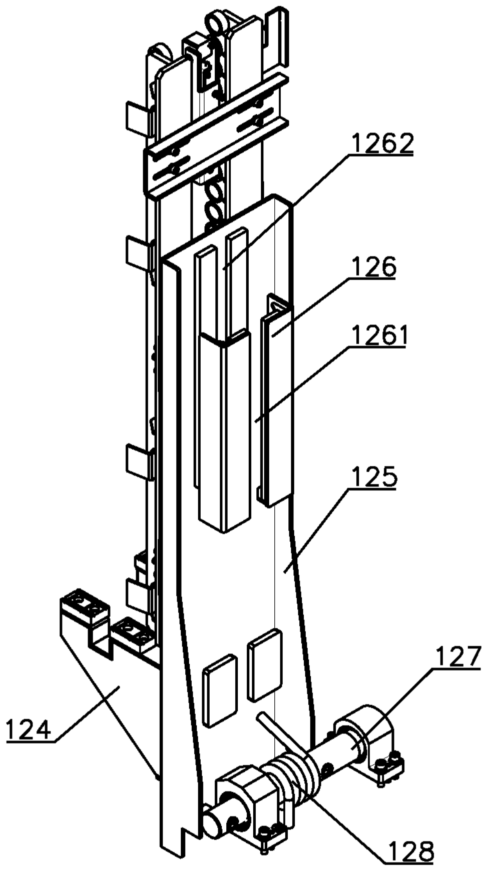
FIG. 19 is a schematic structural diagram of a feeding structure or a discharging structure in another perspective according to a specific implementation of the present disclosure.

Referring to FIG. 19, in order to achieve the above safe turnover process, a connecting box 126 is preferably disposed on the bottom surface of the bottom platform 125, and a through hole 1261 is provided in a bottom surface of the connecting box for the connecting rod to pass through. That is, in the implementation, the connecting rod moves into the through hole to abut against the bottom surface of the bottom platform and drive the feeding structure/discharging structure to turn. In a preferred implementation, a positioning structure 1262 is disposed in the connecting box, and the connecting rod is positioned by being embedded to the positioning structure. That is, in this implementation, with the arrangement of the positioning structure, the feeding structure/the discharging structure may be effectively positioned, and meanwhile, unexpected lateral deviation of the feeding structure/the discharging structure during turnover may be effectively prevented.

Figure 10:
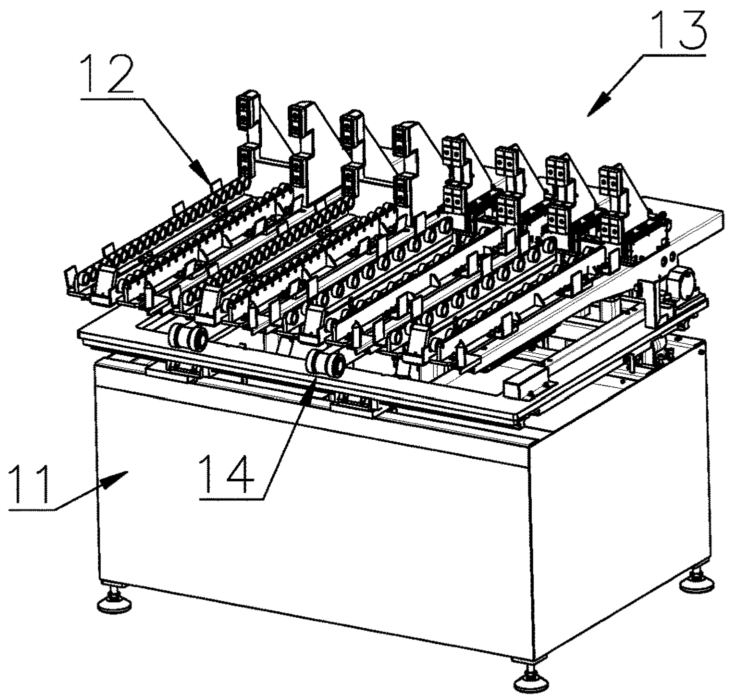
FIG. 10 is a schematic structural diagram of a feeding and discharging structure according to a specific implementation of the present disclosure.

In an optional embodiment, referring to FIG. 10, a plurality of feeding structures 12 are provided, a plurality of discharging structures 13 are provided, and the feeding structures and the discharging structures are provided with the corresponding turnover structures. That is, in this implementation, by arranging the corresponding turnover structures below the feeding structures and the discharging structures, the increase of an overall transverse occupied size of the feeding and discharging structure caused by excessive lateral displacement of the feeding structures/the discharging structures is avoided.

Figure 14:
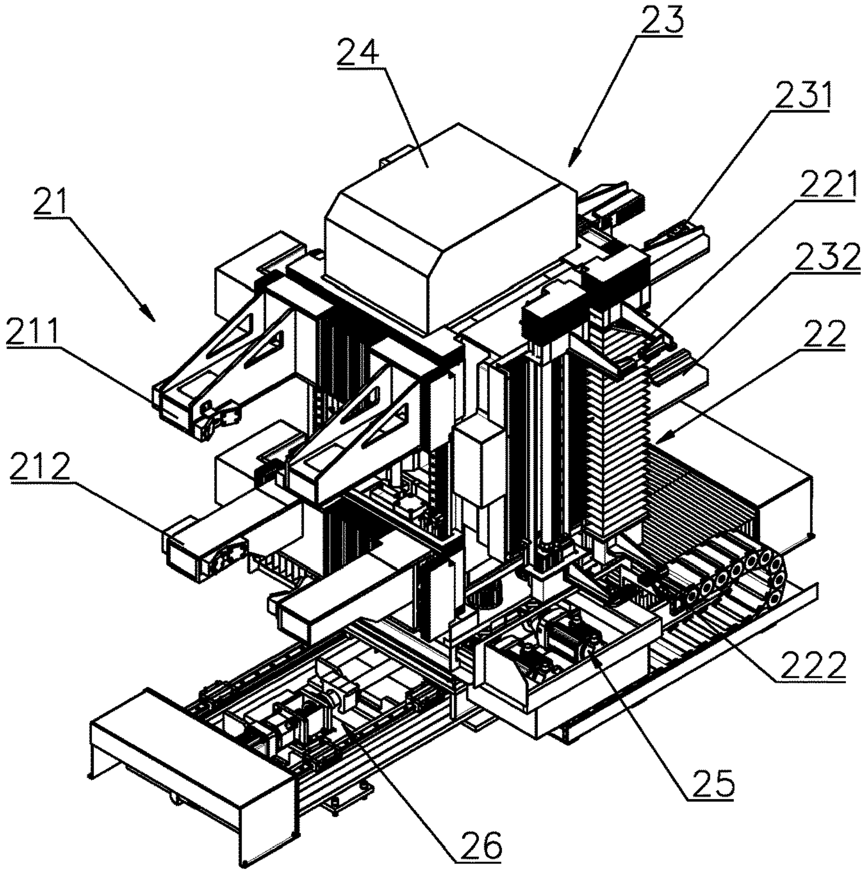
FIG. 14 is a schematic structural diagram of a transferring structure according to a specific implementation of the present disclosure.

In one implementation, referring to FIG. 9 and FIG. 14, the transferring structure includes a rotary table 24, and a round rod clamping structure 21, an edge scrap clamping structure 22 and a square rod clamping structure 23 disposed on side faces of the rotary table respectively. The round rod clamping structure includes at least one round rod clamping jaw. The round rod clamping jaw is used for clamping round rods, and clamping the round rods from the feeding structures and transferring the round rods to the edge scrap cutting structures for edge scrap cutting. In an optional implementation, the round rod clamping structure includes upper round rod clamping jaws 211 and lower round rod clamping jaws 212. The lower round rod clamping jaws are used for clamping the bottom surfaces of the round rods. The upper round rod clamping jaws and the lower round rod clamping jaws are provided with vision sensors or other sensors for measuring lengths of the round rods. Exemplarily, after the lower round rod clamping jaws clamp the bottom surfaces of the round rods, the upper round rod clamping jaws clamp the round rods synchronously, and based on independent Z-axis (vertical) moving structures of the upper round rod clamping jaws, the upper round rod clamping jaws are driven to move upward along the axis direction of the round rods to the tops of the round rods, in which case the lengths of the round rods are measured by the sensors. The edge scrap clamping structure includes an upper edge scrap clamping jaw 221 and a lower edge scrap clamping jaw 222. The upper edge scrap clamping jaw and the lower edge scrap clamping jaw are provided with avoidance structures for internal members of the edge scrap cutting structures, and the internal members may be the upper jacking member and the lower jacking member described above. The edge scrap clamping structure is used for removing edge scraps from the edge scrap cutting structures and transferring the edge scraps into the edge scrap receiving structure. The square rod clamping structure includes at least one square rod clamping jaw for removing the square rods (the bodies described above) from the edge scrap cutting structures and transferring the square rods into the discharging structures. In an optional implementation, the square rod clamping jaws include upper square rod clamping jaws 231 and lower square rod clamping jaws 232.

It is to be noted that the round rod clamping jaws, the edge scrap clamping jaws (including the upper edge scrap clamping jaw and the lower edge scrap clamping jaw), and the square rod clamping jaws herein have independent transverse drive structures and vertical drive structures respectively. The transverse drive structures are used for controlling opening and closing of the clamping jaws, that is, achieving clamping and releasing actions. The vertical drive structures are used for driving a spacing between an upper clamping jaw and a lower clamping jaw. The transverse drive structures and the vertical drive structures may be existing general structures, including but not limited to a combination of a motor, a screw, etc., or as shown in CN212218924U. Meanwhile, referring to FIG. 14, the rotary table has an independent rotating structure 25 and a transverse drive structure 26. The rotating structure is used for driving the rotary table to rotate around a Z axis or rotate transversely, that is, achieving switching of the round rod clamping structure, the edge scrap clamping structure and the square rod clamping structure at a plurality of stations. The transverse drive structure is used for driving the rotary table to move facing away from or towards the feeding and discharging structure or the edge scrap receiving structure. The rotating structure and the transverse drive structure are general structures, as shown in CN212218924U.

Figure 15:
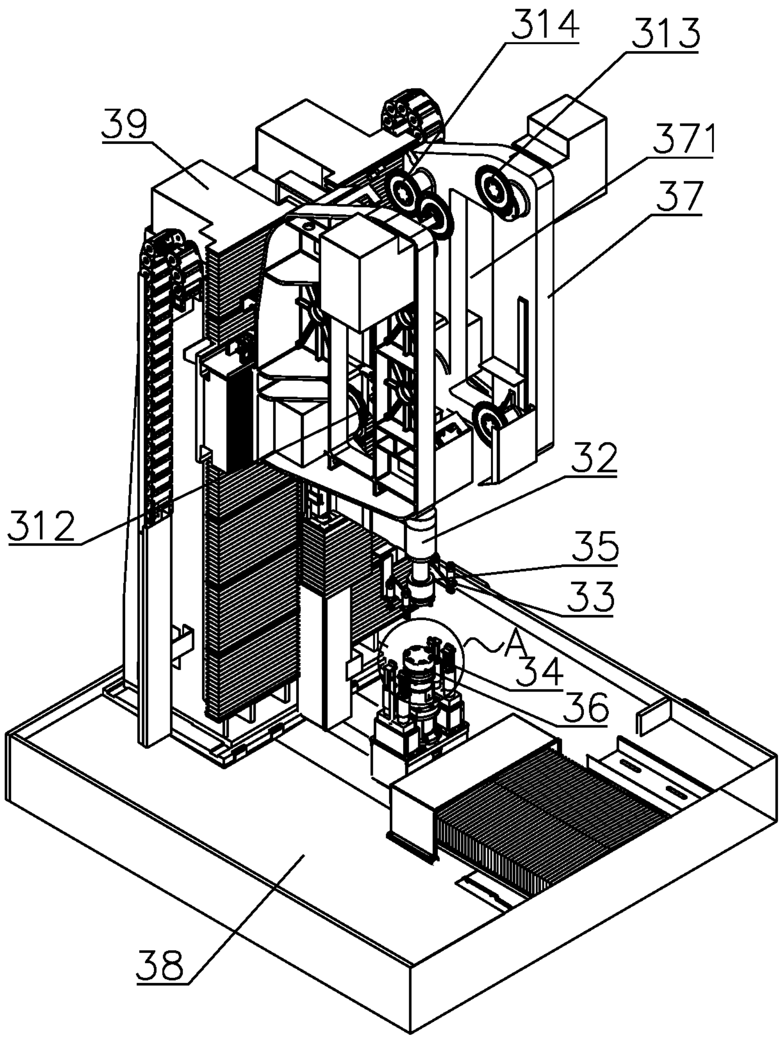
FIG. 15 is a schematic structural diagram of an edge scrap cutting structure according to a specific implementation of the present disclosure.

In one implementation, referring to FIG. 15 (the cutting wire being omitted), the edge scrap cutting structure includes a main framework 39, two cutting structures 37 disposed opposite to each other, an upper jacking structure 32, and a lower jacking structure 36. The cutting structures are mounted on the main framework. The upper jacking structure is mounted on the main framework and located between the two cutting structures. The main framework and the lower jacking structure are fixed to a bearing platform 38. The lower jacking structure and the upper jacking structure are mounted axisymmetrically. The upper jacking member 33 is mounted on the upper jacking structure, and the lower jacking member 34 is mounted on the lower jacking structure. The upper jacking structure has an independent vertical drive structure.

It is to be understood that a cutting wheel train 31 is mounted on the cutting structures 37, through holes 371 are provided in the cutting structures, and a size of the through holes does not allow the edge scraps to pass through except under special circumstances.

In an optional implementation, the edge scrap cutting structure further includes a sensor group mounted therein. The sensor group is used for detecting a crystal line position of the round rod under clamping of the upper jacking structure and the lower jacking structure, so as to control a feeding distance of the cutting structure by means of a controller, etc., to ensure cutting accuracy. Specifically, after the round rod is jacked by the upper jacking structure and the lower jacking structure, a left sensor and a right sensor (detection sensing components) extend to prepare the measurement of the crystal line. When the round rod is driven by the lower jacking structure to rotate, if the sensors detect out that the crystal line does not meet the standard, the clamping jaws of the transferring structure re-clamp the round rod and re-place the round rod to a position between the upper jacking structure and the lower jacking structure, and the preceding steps are repeated. If a measurement result still does not meet the standard, a rod return process is carried out directly, that is, the round rod is directly transferred to the discharging structure or other recovery structures. It is to be noted that a method for measuring crystal lines of round rods by the sensors is a general technology in the industry, which is not repeated here.

The upper jacking structure and the lower jacking structure are general structures, as shown in CN114474437A, CN218365781U or CN217144436U.

Specifically, in terms of the process, referring to FIG. 1 to FIG. 8 and FIG. 15, the spacing between the upper jacking structure 32 and the lower jacking structure 36 is adjusted by the vertical drive structure based on the length of the round rod measured by the round rod clamping structure, so that while the round rod 5 is placed between the upper jacking structure and the lower jacking structure, the upper jacking structure is driven by the vertical drive structure to abut against the top surface of the round rod, and when the round rod (a monocrystalline silicon rod with a circular cross section) is clamped by the upper jacking structure and the lower jacking structure, the upper jacking member 33 abuts against an upper surface of the edge scrap (any position of the top surface of the edge scrap pre-calculated after formation of the edge scrap). In this case, after the cutting structure 31 moves to the cutting holding position, the upper jacking member moves upward as a whole and forms a channel for the cutting wire 311 to move to an edge scrap cutting position, and after the cutting wire moves to the edge scrap cutting position, the upper jacking member moves downward as a whole to abut against the upper surface of the edge scrap again. After the cutting wire completely cuts the edge scrap, lower wire withdrawal of the cutting wire is achieved by sequentially controlling the lower jacking member to move up and down in the withdrawal process of the cutting wire. After withdrawal of the cutting wire, the cutting structures reset to the cutting holding position or moves to the allowed farthest end (compared to the axis of the round rod). In this case, the edge scrap clamping structure extends to the position between the two cutting structures, the upper edge scrap clamping jaw clamps the top of the edge scrap, the lower edge scrap clamping jaw clamps the bottom surface of the edge scrap, and after waiting for the upper jacking member and the lower jacking member to completely release the clamping state, the edge scrap clamping structure clamps and transfers the edge scrap. When the rotating structure switches the square rod clamping structure to a corresponding cutting station of the edge scrap cutting structure, the square rod clamping jaw extends to the position between the cutting structures and clamps side portions of a square rod respectively. In this case, the upper jacking structure and the lower jacking structure release clamping of the square rod, and the square rod clamping structure takes out and transfers the square rod. In an optional implementation, during transferring of the edge scrap clamping structure, the square rod clamping structure gradually rotates to a cutting station. During transferring of the square rod clamping structure, the round rod clamping structure that clamps a round rod gradually rotates to the cutting station, and after completely entering the cutting station, the round rod clamping structure conveys the round rod to the position between the upper jacking structure and the lower jacking structure. In this implementation, with such process control, the overall process flow is reduced and production efficiency is improved.

It is to be noted that in this implementation, the cutting wheel train may be an existing cutting wheel train with any quantity of wheels, such as a two-wheel train, a three-wheel train, or a four-wheel train. In a preferred implementation, the cutting wheel train is a four-wheel train. Referring to FIG. 15, the cutting wheel train has a general structure, for example, including at least one driving wheel 312, a tensioning wheel 313, and two guiding wheels (or driven wheels) 314, or as shown in CN212218920U or CN217098379U. The tensioning wheel adjusts the tension of the cutting wire by means of a weight or a motor, and a specific adjustment method is an existing technology, for example, as in CN113997436A or CN213593322U. Meanwhile, in this implementation, the cutting wire is preferably a ring diamond wire, that is, the cutting wire is in an end-to-end manner, which is different from an existing long wire (which is not in an end-to-end manner).

It is also to be noted that FIG. 15 is a schematic diagram of the edge scrap cutting structure, aiming to show main structural characteristics of the edge scrap cutting structure. If there is any discrepancy between some structures and the content of the document, the document shall prevail.

Figure 16:
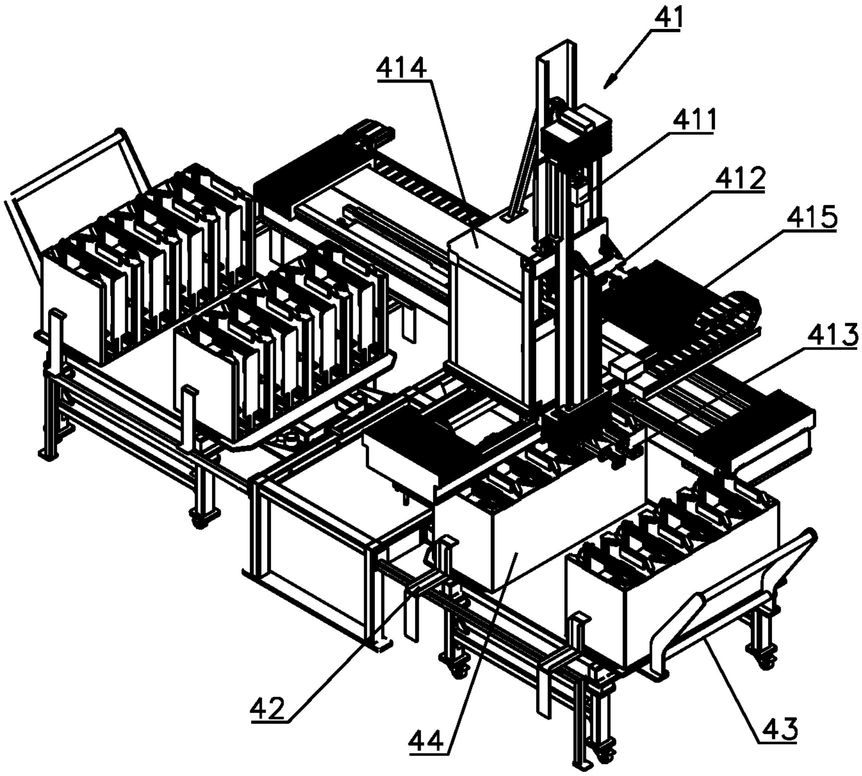
FIG. 16 is a schematic structural diagram of an edge scrap receiving structure according to a specific implementation of the present disclosure.
Figure 17:
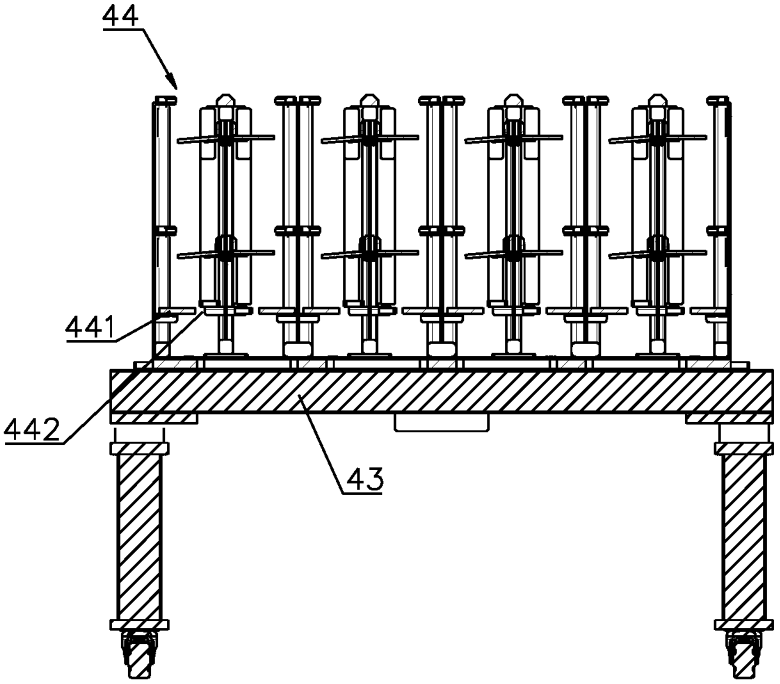
FIG. 17 is a schematic cross-sectional view of an edge scrap receiving box according to a specific implementation of the present disclosure.

In one implementation, referring to FIG. 16, the edge scrap receiving structure 4 includes an edge scrap clamping jaw assembly 41, an edge scrap receiving table 42, and an edge scrap receiving box 44 disposed on the edge scrap receiving table. The edge scrap clamping jaw assembly includes a mounting frame 414, an upper edge scrap clamping jaw 412, a lower edge scrap clamping jaw 413, a vertical drive structure 411, a transverse drive structure 415 (an XY mobile platform), and a rotating structure (not show). The vertical drive structure is mounted on the mounting framework and used for controlling a spacing between the upper edge scrap clamping jaw and the lower edge scrap clamping jaw. The transverse drive structure and the rotating structure are mounted on the mounting framework. The transverse drive structure is used for driving the mounting framework to move in an X axis or a Y axis. The rotating structure is used for driving the mounting framework to rotate around a Z axis. The upper edge scrap clamping jaw and the lower edge scrap clamping jaw are provided with avoidance structures for avoiding related members of the upper edge scrap clamping jaw and the lower edge scrap clamping jaw in the transferring structure. Meanwhile, the lower edge scrap clamping jaw is further provided with an avoidance structure for avoiding a limiting structure on a bottom surface of the edge scrap receiving box. The structure of the edge scrap receiving box is shown in FIG. 17, which is a general structure of a prior application of the applicant. The bottom surface of the edge scrap receiving box is provided with the limiting structure 441 for supporting the bottom surface of the edge scrap, so as to prevent the edge scrap from being separated from the bottom surface of the edge scrap receiving box. Meanwhile, a pore 442 is formed between the limiting structure and a shell of the edge scrap receiving box for the lower edge scrap clamping jaw to pass through. That is, in one implementation, when the lower edge scrap clamping jaw extends into the edge scrap receiving box and the edge scrap is limited by the limiting structure, the lower edge scrap clamping jaw may move out of the edge scrap receiving box from the pore and reset.

In an optional implementation, the lower edge scrap clamping jaw has an independent transverse drive structure (not shown in FIG. 16) for controlling relative movement of two clamping jaws in the lower edge scrap clamping jaw, thereby controlling an overall clamping width of the lower edge scrap clamping jaw to adapt to edge scraps/round rods of different sizes. The transverse drive structure is a general structure, as shown in CN212218924U.

The rotating structure and the transverse drive structure mounted on the mounting framework may be general structures in the art, for example, as shown in CN212218924U, or other conventional structures capable of performing the functions described above are applicable to this implementation.

Combined with the specific production, when the edge scrap clamping jaw assembly of the edge scrap receiving structure receives edge scraps from the transferring structure, the mounting framework is driven by the transverse drive structure to be transferred to a position above the edge scrap receiving box, the edge scrap clamping jaw assembly is driven by the vertical drive structure to move downward into the edge scrap receiving box, and after the edge scrap is received by the edge scrap receiving box, the lower edge scrap clamping jaw moves out of the pore, and the edge scrap clamping jaw assembly is reset.

In a preferred implementation, the overall height of the edge scrap receiving box is smaller than the height of the edge scraps. That is, in this implementation, when the lower edge scrap clamping jaw moves out of the pore, the upper edge scrap clamping jaw does not extend into a cavity of the edge scrap receiving box, that is, the upper edge scrap clamping jaw is not limited by the edge scrap receiving box, which facilitates a resetting process of the upper edge scrap clamping jaw.

Figure 18:
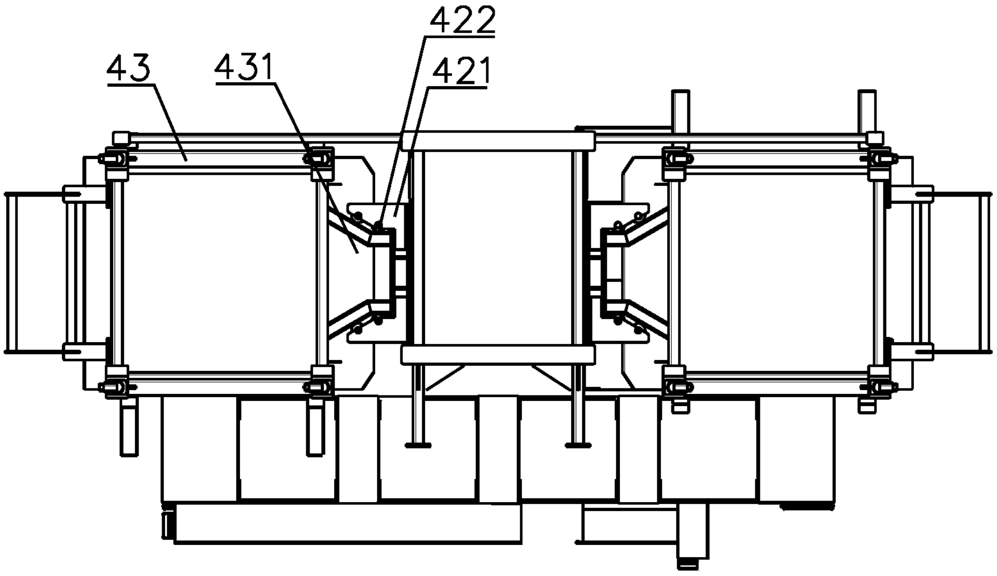
FIG. 18 is a specific top view of an edge scrap receiving structure according to a specific embodiment of the present disclosure.

In another preferred implementation, referring to FIG. 16 to FIG. 18, the edge scrap receiving structure further includes a traveling trolley 43. The edge scrap receiving box is fixed to the traveling trolley. A first positioning structure 431 is disposed at an end, facing the edge scrap clamping jaw assembly, of the traveling trolley. A second positioning structure 421 matching the first positioning structure is disposed at a position, corresponding to the first positioning structure, of the edge scrap receiving table 42. Through cooperation of the first positioning structure and the second positioning structure, the full edge scrap receiving box may be moved and emptied through the traveling trolley while the traveling trolley is positioned. More preferably, a pulley 422 is disposed between the first positioning structure and the second positioning structure. The pulley is disposed on the first positioning structure and/or the second positioning structure to facilitate a positioning process of the two.

The above are merely embodiments of the present disclosure, and are not intended to limit the scope of the patent of the present disclosure. Any equivalent transformation made by utilizing the contents of the specification and accompanying drawings of the present disclosure, or directly or indirectly applying them in the related technical fields, similarly fall within the protection scope of the patent of the present disclosure.

What is claimed is:

1. A lower jacking member, for axially fixing a bottom surface of an edge scrap formed by cutting a round rod, a bottom outline of the edge scrap having a cutting edge, wherein the lower jacking member comprises at least two single components, and drive structures independently connected to the single components;

a spacing between at least one of the single components and the cutting edge is different from a spacing between the rest of the single components and the cutting edge; and the drive structures are used for driving tops of the single components to abut against the bottom surface of the edge scrap.

2. The lower jacking member according to claim 1, wherein each of the single components comprises a base and a pressing block, wherein the base is connected to the drive structure, the pressing block is disposed on the base, and a top surface of the pressing block is higher than a top surface of the base; and a spacing between at least one of the pressing blocks and the cutting edge is different from a spacing between the rest of the pressing blocks and the cutting edge.

3. A wire withdrawal method, wherein a lower wire withdrawal process of a cutting wire is performed by means of the lower jacking member according to claim 1, the wire withdrawal method comprises following steps:

moving a cutting wheel train to a cutting holding position, wherein an upper jacking structure, a upper jacking member, a lower jacking structure and the lower jacking member abut against a top surface and a bottom surface of a monocrystalline silicon rod respectively;

moving the upper jacking member upward to allow the cutting wire to move radially to a cutting position, afterwards moving the upper jacking member downward to abut against the top surface of the monocrystalline silicon rod again;

cutting the monocrystalline silicon rod from top to bottom along an axis direction of the monocrystalline silicon rod by the cutting wire, so as to form the edge scrap, wherein a top surface of the edge scrap is supported and held in place by the upper jacking member, and the bottom surface of the edge scrap is supported and held in place by the lower jacking member;

moving a pressure head with a small spacing from a straight line downward to allow the cutting wire to move transversely for withdrawal to a position between two adjacent pressure heads, wherein the straight line is the cutting edge;

moving the pressure head with the small spacing from the straight line upward to abut against the bottom surface of the edge scrap again, the cutting wire being located between the two adjacent pressure heads, and a withdrawal movement being prevented by the pressure head with a large spacing from the straight line;

moving the pressure head with the large spacing from the straight line downward to allow the cutting wire to withdraw;

the cutting wire completely withdrawing from the lower jacking member and moving to the cutting holding position; and moving the pressure head with the large spacing from the straight line upward to abut against the bottom surface of the edge scrap again.

4. The wire withdrawal method according to claim 3, wherein at least one of the single components abuts against the bottom surface of the edge scrap in the lower wire withdrawal process of the cutting wire by means of sequence control over the single components.

5. The wire withdrawal method according to claim 4, wherein the sequence control is to control vertical displacement of the pressing blocks successively from a pressing block with a smallest spacing from the cutting edge to a pressing block with a largest spacing from the cutting edge in the lower wire withdrawal process of the cutting wire.

6. A squaring machine, comprising the lower jacking members according to claim 1.

7. The squaring machine according to claim 6, comprising edge scrap cutting structures, a feeding and discharging structure, a transferring structure, and an edge scrap receiving structure, wherein the lower jacking members are mounted in the edge scrap cutting structures; and the transferring structure is disposed among the feeding and discharging structure, the edge scrap cutting structures and the edge scrap receiving structure, and used for transferring round rods from the feeding and discharging structure into the edge scrap cutting structures, transferring edge scraps formed by cutting in the edge scrap cutting structures into the edge scrap receiving structure, and transferring square rods formed by cutting in the edge scrap cutting structures into the feeding and discharging structure.

8. The squaring machine according to claim 7, wherein the feeding and discharging structure comprises a machine table, feeding structures, discharging structures, transverse displacement structures, and at least one turnover structure, wherein the feeding structures, the discharging structures and the transverse displacement structures are mounted on the machine table, the feeding structures and the discharging structures are hinged to the transverse displacement structures, and the turnover structures are located in the machine table and located below the feeding structures and the discharging structures.

9. The squaring machine according to claim 8, wherein the feeding structure or the discharging structure comprises a bottom platform, two side plates disposed on the bottom platform, an ejector block, and a supporting assembly, wherein the side plates are vertically disposed on a surface of the bottom platform, the two side plates are parallel and spaced apart, rollers are disposed on inner walls and outer walls of the side plates, the supporting assembly is disposed at one ends of the side plates in a length direction, the ejector block is disposed at the other ends of the side plates in the length direction, and the ejector block is located between the two side plates.

10. The squaring machine according to claim 9, wherein the supporting assembly comprises guide rails, two sliders disposed on the two guide rails, veneers disposed on the sliders, and an air cylinder connected to at least one of the sliders.

11. The squaring machine according to claim 8, wherein the turnover structure comprises a connecting rod, a first connecting seat hinged to one end of the connecting rod, a turnover drive piece hinged to a middle of the connecting rod, and a second connecting seat hinged to the turnover drive piece.

12. The squaring machine according to claim 8, wherein a plurality of feeding structures are provided, a plurality of discharging structures are provided, and the feeding structures and the discharging structures are provided with the corresponding turnover structures.

13. The squaring machine according to claim 7, wherein the transferring structure comprises a rotary table, and a round rod clamping structure, an edge scrap clamping structure and a square rod clamping structure disposed on side faces of the rotary table respectively.

14. The squaring machine according to claim 7, wherein each of the edge scrap cutting structures comprises a main framework, two cutting structures disposed opposite to each other, an upper jacking structure, a lower jacking structure, and a bearing platform, wherein the cutting structures are mounted on the main framework, the upper jacking structure is mounted on the main framework and located between the two cutting structures, the main framework and the lower jacking structure are fixed to the bearing platform, the lower jacking structure and the upper jacking structure are mounted axisymmetrically, an upper jacking member is mounted on the upper jacking structure, and the lower jacking member is mounted on the lower jacking structure.

15. The squaring machine according to claim 7, wherein the edge scrap receiving structure comprises an edge scrap clamping jaw assembly, an edge scrap receiving table, and an edge scrap receiving box placed on the edge scrap receiving table.

16. The squaring machine according to claim 15, wherein the edge scrap clamping jaw assembly comprises a mounting framework, an upper edge scrap clamping jaw, a lower edge scrap clamping jaw, a vertical drive structure, a transverse drive structure, and a rotating structure, wherein the vertical drive structure is mounted on the mounting framework and used for controlling a spacing between the upper edge scrap clamping jaw and the lower edge scrap clamping jaw; and the transverse drive structure and the rotating structure are mounted on the mounting framework, the transverse drive structure is used for driving the mounting framework to move transversely, and the rotating structure is used for driving the mounting framework to rotate around a Z axis.

17. The squaring machine according to claim 16, wherein a limiting structure is disposed at a bottom of the edge scrap receiving box.

18. The squaring machine according to claim 15, wherein an overall height of the edge scrap receiving box is smaller than a height of the edge scrap.

19. The squaring machine according to claim 15, further comprising a traveling trolley, wherein the edge scrap receiving box is fixed to the traveling trolley, a first positioning structure is disposed at an end, facing the edge scrap clamping jaw assembly, of the traveling trolley, and a second positioning structure matching the first positioning structure is disposed at a position, corresponding to the first positioning structure, of the edge scrap receiving table.

20. The squaring machine according to claim 7, wherein a cutting wire for forming the cutting edge is a ring wire.

* * * * *